3,543,438
PLANT GROWING MEANS AND METHOD OF
MAKING SAME
Paul R. Edwards, Orlando, Fla., assignor to Edwards Enterprises of Orlando, Inc., Orlando, Fla., a corporation of Florida
Filed Jan. 5, 1968, Ser. No. 695,975
Int. Cl. A01g 9/10
U.S. Cl. 47—34.13
4 Claims

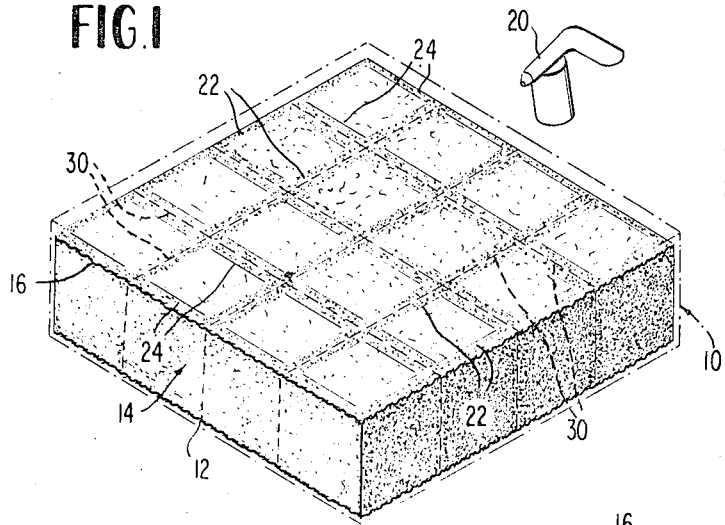
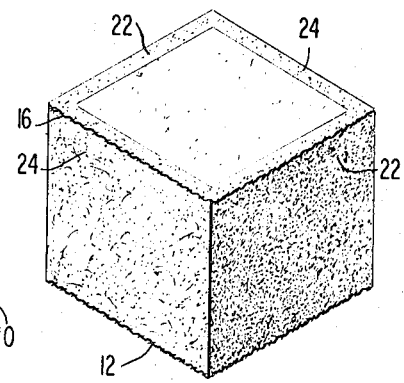
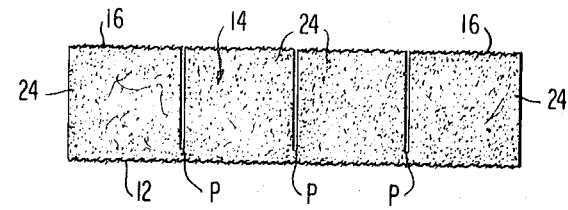
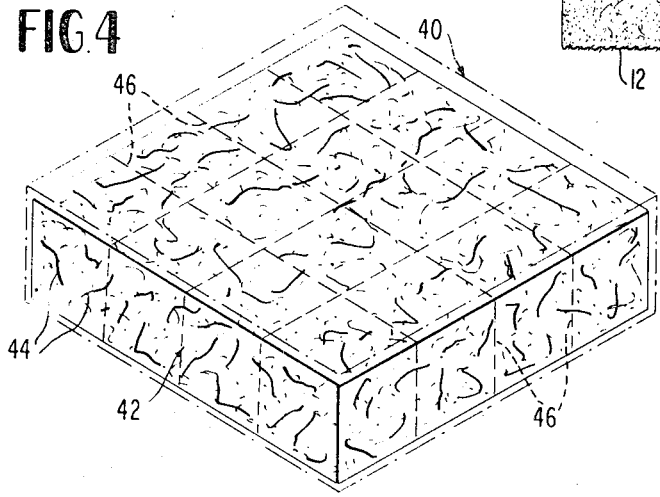
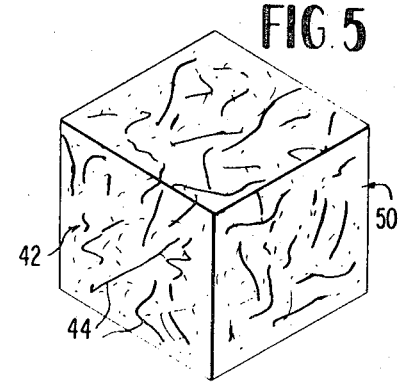
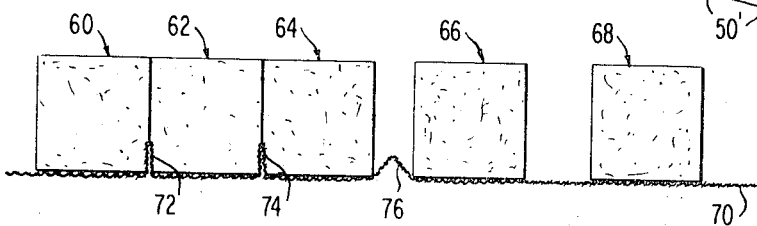
INVENTOR
PAUL R. EDWARDS United States Patent Office 3,543,438
Patented Dec. 1, 1970

ABSTRACT OF THE DISCLOSURE

A body of loose discrete particles of plant growth material is disposed between two spaced porous members and an adhesive or binder means extends around the sides of the material to hold it in place. A plurality of such bodies may be interconnected wherein the porous members at one side of the bodies comprise portions of a single sheet of material. A plurality of bodies of self-supporting plant growth material are also provided and include filamentary binder means. These self-supporting bodies may be secured in fixed spaced relationship to a sheet of material. This latter sheet of material may be folded upon itself and sandwiched between adjacent bodies.

BACKGROUND OF THE INVENTION

The present invention relates to plant growing means in the form of one or more bodies of a plant growth medium into which portions of plants or seedlings are inserted, each individual body containing sufficient nutrient substances for sustaining a cutting or seedling for a desired period of time.

Plant growing means in the form of synthetic soil blocks or pellets of a growing medium have been employed in the prior art for plant propagation. Such arrangements have been difficult to manufacture since they are formed of loose materials which require some sort of means to retain the completed bodies in their finished form.

Additionally, the bodies of such growing medium as utilized in the prior art are manufactured so as to be separate and independent units making it difficult to handle a large number of bodies at one time during shipping or use thereof. Furthermore, no means is provided for retaining the bodies in spaced relationship to one another. This presents a problem when shipping the bodies since they may be packed in such a manner that they can collide with one another in transit thereby damaging the bodies. A problem also arises when using the bodies for growing plants, as it is often desirable to maintain a certain amount of space between adjacent bodies so that growing plants associated therewith will have adequate room for growth.

SUMMARY OF THE INVENTION

The plant growing means of the present invention comprises one or more bodies which may be compressed to substantially reduce the size thereof thereby requiring less storage space and lowering freight charges. The bodies are of porous construction whereby they can be watered without danger of overwatering as the sides will drain as well as the bottoms thereof. This porous construction also enables plants to grow rapidly when transplanted since the roots thereof can easily penetrate the porous walls of the bodies.

The bodies of the present invention do not require sterilization and are substantially uniform throughout so that by varying their methods of operation, growers may discover which particular method will provide the best results. The bodies are light in weight and completely eliminate the necessity of providing pots in starting plants for later benching, or for bedding plants.

In some instances, the sidewall of the bodies according to the present invention incorporate a binder substance to prevent root penetration when such penetration is undesirable.

In one form of the present invention, a plurality of bodies of plant growth material are secured in predetermined spaced relationship to a suitable connecting means. This arrangement permits a plurality of bodies to be readily handled at one time, such as when putting them on a growing bench in groups up to seventy or more, thereby reducing the amount of time and effort involved. This construction also enables the bodies to be maintained in spaced relationship during shipping operations, the connecting means affording a convenient means for attaching the bodies in place within a shipping container.

A further form of the invention includes a plurality of bodies secured to a connecting means wherein portions of the connecting means are doubled upon itself and sandwiched between adjacent bodies. This permits the bodies to be stored or shipped in closely adjacent relationship to one another. When it is subsequently desired to spread the bodies apart into a predetermined spacing with respect to one another, the connecting means can be manually grasped and pulled to produce the desired spacing.

The present invention provides a new and novel plant growing means in the form of one or more bodies of porous compressible construction, wherein a plurality of bodies may be handled at one time, and the bodies may be maintained in desired position relative to one another. Further, a novel method of making the plant growing means is provided which enables the manufacture thereof in a simple, inexpensive and expedient manner and without requiring the use of complex apparatus or the employment of highly skilled personnel.

BRIEF DESCRIPTION OF THE DRAWING

FIG. 1 is a top perspective view illustrating the method of making a first form of the invention.

FIG. 2 is an end view illustrating the completed assembly of FIG. 1 after a cutting operation is completed.

FIG. 3 is a top perspective view illustrating an individual body according to the present invention.

FIG. 4 is a top perspective view illustrating a method of making the second form of the present invention.

FIG. 5 is a top perspective view illustrating an individual body on a large scale as produced by the method illustrated in FIG. 4.

FIG. 6 is a top view illustrating the manner in which a plurality of bodies are secured to a connecting means, and FIG. 7 illustrates a further modified form of the invention.

DESCRIPTION OF THE PREFERRED EMBODIMENTS

Referring now to the drawings wherein like reference characters designate corresponding parts throughout the several views, as seen in FIG. 1, an open top container of suitable dimensions is indicated by phantom line 10. The first step in carrying out this method of making the plant growing means of the present invention comprises placing a sheet of material 12 in the bottom of a container, this sheet of material being of a suitable porous material such as a cheese cloth fabric or the like.

The next step in the method is to dispose a layer of mateiral 14 upon the upper surface of the sheet 12. This layer of material 14 comprises a plurality of discrete particles of plant growth material. The plant growth material may typically comprise bagasse, coarsely milled sphagnum moss, and wood shavings or the like, these various materials being employed either alone or in various combinations with one another. The loose plant growth material may also include lime so as to correct acidity, suitable fertilizers for plant nutrition, a surfactant to lessen the time required to wet the bodies before planting, and additionally a suitable preservative to delay the time it takes the material to break down.

After these discrete pieces of plant growth material have been disposed in position so as to form the layer 14, a further sheet of material 16 is placed over layer 14. This sheet 16 is also formed of a suitable porous material, and although it need not necessarily be the same material as sheet 12, it is also preferably formed of fabric.

The next step in the method as disclosed in FIG. 1 is to dispose adhesive means along elongated areas of the assembly including layers 12, 14 and 16. In order to dispose the adhesive means along the desired elongated areas, a suitable means such as a hand-held spray gun 20 may be employed. The adhesive means is sprayed from the gun in a jet-like stream which is adapted to penetrate through the thickness of the entire assembly including the layers 12, 14 and 16. A first plurality of areas 22 extending generally parallel with one another are formed by spraying the adhesive material along the areas indicated including the opposite side portions of the overall assembly. These elongated areas not only extend substantially through the thickness of the assembly, but also extend substantially from one side of the assembly to the opposite side thereof. Any suitable means may be employed for disposing the adhesive means in place. In some instances the assembly may be compressed as the adhesive means is disposed in place in order to prevent the plant growth material from scattering excessively.

The next step in carrying out the method is to provide a further plurality of elongated areas 24 of adhesive material, the latter areas also extending substantially through the thickness of the assembly and being generally parallel with one another as well as extending substantially normally to the first plurality of areas 22. It will also be noted that areas 24 extend along the opposite side portions of the assembly. The areas of adhesive 22 and 24 are illustrated as extending substantially perpendicular to one another where the bodies are to be rectangular as seen from above. The areas may, of course, be differently oriented where other configurations of the finished bodies are desired.

After the adhesive material has been injected into the position illustrated, the entire assembly which is now bound together by the areas of adhesive material may be lifted from the container 10. A suitable cutting means in the form of a knife or the like is then employed for severing the completed assembly to divide it into a plurality of individual bodies. The severing operation involves cutting the overall assembly substantially medially along each of said adhesive areas except for those adhesive areas along the sides of the assembly. The cutting lines are indicated by the dotted lines 30 as seen in FIG. 1. Accordingly, after the assembly has been cut as indicated, the width of cut is such that a portion of each of the adhesive areas lies along the side wall of each individual body as defined by the cutting operation to thereby retain the loose plant growth material in operative position, it being understood that these adhesive portions extend between the spaced portions of fabric and are in engagement therewith.

It is important to note that the adhesive material cannot be mixed at random with the plant growth material to build up the assembly since the mixture must be able to absorb water in order to properly support plant growth.

In cutting the assembly as shown in FIG. 1, the cutting may be carried out only through the upper layer of fabric or the like 16 and thence through the adhesive portions extending through the thickness of layer 14 of plant growth material, the bottom sheet 12 of the assembly not being cut, as illustrated in FIG. 2. In this figure, the cuts terminate at the points indicated by reference characters P. It is apparent that all of the individual bodies defined by the cutting operation are still attached to the single sheet of material 12 whereby the overall assembly may be readily handled. When it is desired to subsequently employ individual bodies, the cuts may then be continued downwardly through the bottom layer of fabric or the like 12 so that each body will be completely separate and independent from all the others. In cutting the assembly of FIG. 1, the cuts may extend completely through the assembly to separate the assembly into a plurality of separate and independent bodies, one of which is shown on an enlarged scale in FIG. 3.

When it is desired to prevent root penetration of the sidewalls of the bodies, a suitable binder such as polystyrene or the like may be incorporated in the substance disposed along elongated areas 22 and 24 as seen in FIG. 1.

Referring now to FIG. 4 of the drawings, a further manner of making plant growing means is illustrated. A suitable open top container is provided as indicated by phantom line 40, and a body 42 formed of a plurality of discrete pieces of plant growth material as described hereinabove is disposed within the container up to a suitable level therein. Additionally, filamentary means 44 in the form of filaments of polyethylene or the like are disposed among the discrete pieces of plant growth material. These pieces of filamentary material may be of various diameters and lengths and are interpersed at random among the pieces of plant growth material.

The entire mixture as shown in FIG. 4 is then subjected to heat so as to cause the filamentary means to fuse. When the filamentary means fuses, the individual pieces thereof become bonded to the adjacent pieces of plant growth material. When the entire mixture is then allowed to cool, the filamentary means provides a binder means for retaining the pieces of plant growth material in a coherent mass.

After the large mass illustrated in FIG. 4 has been formed as described hereinbefore, the mass is then cut along the dotted lines 46 to divide the overall mass into a plurality of bodies comprising plant growing means according to the present invention. Each of the separate bodies is self-supporting and provides large exposed areas for receiving portions of plants. An individual body 50 as seen in FIG. 5 may be employed for plant propagation.

On the other hand, it is often desirable to handle a plurality of plant growing bodies at one time. Accordingly, a plurality of individual bodies may be attached to a single sheet of the material comprising a connecting means for retaining the bodies in predetermined spaced relationship with respect to one another. Referring to FIG. 6, a plurality of individual bodies 50', identical to the body 50 illustrated in FIG. 5, are each secured by an adhesive substance or the like to a single sheet of material 52 which may also be formed of fabric or any other suitable porous substance. At this point it should be noted that while the sheets of material are defined as being porous, the same results can be obtained by providing a sheet of material which is generally non-porous and then providing a plurality of holes therethrough so as to create adequate drainage for bodies supported thereby. A plurality of bodies similar to that shown in FIG. 3 may be secured to sheet 52 in place of bodies 50 if so desired.

Referring now to FIG. 7 of the drawings, still a further modified form of the invention is illustrated. A plurality of bodies 60, 62, 64, 66, and 68 which are substantially identical in construction to the body 50 previously described are suitably secured as by adhesive or the like to a single sheet 70 of a suitable porous material such as fabric or the like. These bodies of material are disposed in predetermined fixed relationship to one another when the sheet 62 is in a flattened condition. Here again, bodies similar to that shown in FIG. 3 may be secured to sheet 70 in place of bodies 60–68 if so desired.

Portions 72, 74 of the sheet of material between adjacent bodies 60 may be doubled upon itself as lilustrated in the left-hand portion of FIG. 7 and then sandwiched between adjacent bodies 60, 62 and 62, 64 respectively. This enables the entire assembly to initially be positioned as shown at the left-hand portion of FIG. 7 with the adjacent bodies disposed quite close to one another with the doubled up portions of sheet 70 tightly sandwiched between adjacent bodies of material.

When it is desired to subsequently spread the bodies 60 of material apart, opposite side edges of the sheet 70 may be manually grasped as illustrated and then pulled apart so as to separate the bodies into predetermined spacing with respect to one another. As shown, the right-hand most body 68 is disposed in its maximum spaced relationship with respect to the next adjacent body 66, while the body 66 has just started to move away from the body 64 to the left thereof and the doubled up portion 76 of sheet 70 has started to flatten out.

It is evident that the individual bodies as discussed in connection with FIGS. 5, 6, and 7 may also have a suitable binder similar to that previously described incorporated in the sidewalls thereof to prevent root penetration when so desired.

It is apparent from the foregoing that there is provided according to the present invention new and novel plant growing means in the form of one or more bodies of porous compressible construction. Since the materials employed in each of the individual bodies of the present invention are readily compressible, they may be compressed prior to the shipping to a fraction of their normal size. They can be subsequently expanded by saturating them with water and allowing them to rise to their original dimension.

A plurality of bodies may be handled at one time by grasping the connecting means secured thereto, and the bodies may thereby be maintained in desired position relative to one another. A novel method of making the plant growing means is provided which enables the manufacture thereof in a very simple, inexpensive and expedient manner, and yet without requiring the use of complex apparatus or the employment of highly skilled personnel. It is obvious that only the simplest of apparatus in the form of an open top container, a spray gun or the like and a suitable cutting means such as a knife are required for carrying out the method of the present invention, and furthermore the steps involved are relatively simple and do not require highly skilled operators.

It will be obvious to those skilled in the art that many modifications may be made within the scope of the present invention without departing from the spiirt thereof, and the invention includes all such modifications.

What is claimed is:

1. Plant growing means comprising a planar body of porous plant growth material, an adhesive substance extending through said material sufficient to define intersecting lines forming individual porous cells bounded by said adhesive, and at least one porous sheet member secured to a planar side thereof with said adhesive.

2. Plant growth means according to claim 1 including porous sheet members secured to both planar sides with said adhesive.

3. Plant growth means according to claim 1 wherein said adhesive contains a root-growth retardant.

4. A method of making a plant growing means comprising providing a mass of porous plant growth material upon a support to define a substantially planar body, applying an adhesive substance in criss-crossing lines through said mass whereby individual cells of plant growth material are formed, separating cells along said lines whereby said adhesive substance extends substantially around each cell, and securing said cells upon a porous sheet member in a predetermined spaced relationship, said porous sheet member being sufficiently flexible to be folded inwardly between said cells to bring the latter into juxtaposition.

References Cited
UNITED STATES PATENTS

| 1,172,787 | 2/1916 | Gray | 47—14 |
| 2,785,969 | 3/1957 | Clawson | 47—34 XR |
| 2,848,842 | 8/1958 | Tennant | 47—34 |
| 3,172,234 | 3/1965 | Eavis | 47—1.2 |
| 3,233,365 | 2/1966 | Bergann | 47—1.2 |
| 3,375,607 | 4/1968 | Melvold | 47—37 |

FOREIGN PATENTS

| 1,429,952 | 1/1966 | France. |
| 1,551,807 | 11/1968 | France. |

ROBERT E. BAGWILL, Primary Examiner

U.S. Cl. X.R.
47—58; 71—64